Jan. 19, 1971   W. A. KUHN   3,555,645
METHOD OF MAKING SPHERICAL BEARINGS
Filed Nov. 29, 1968
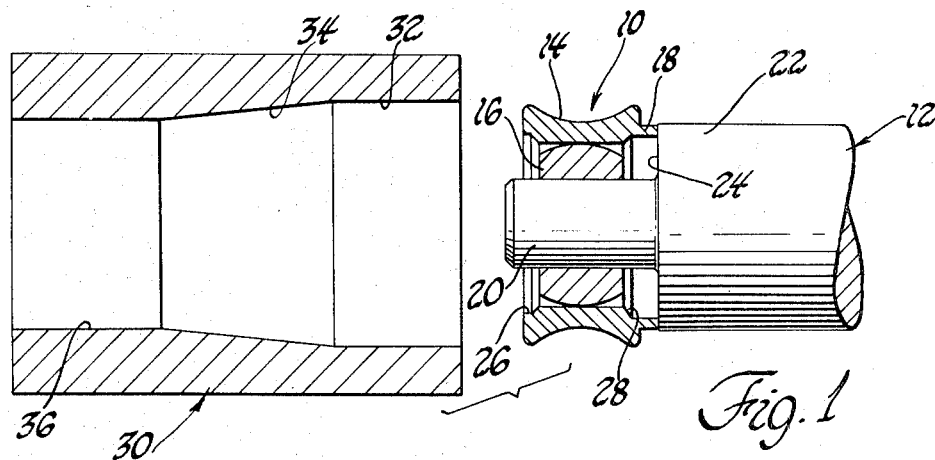
Fig. 1
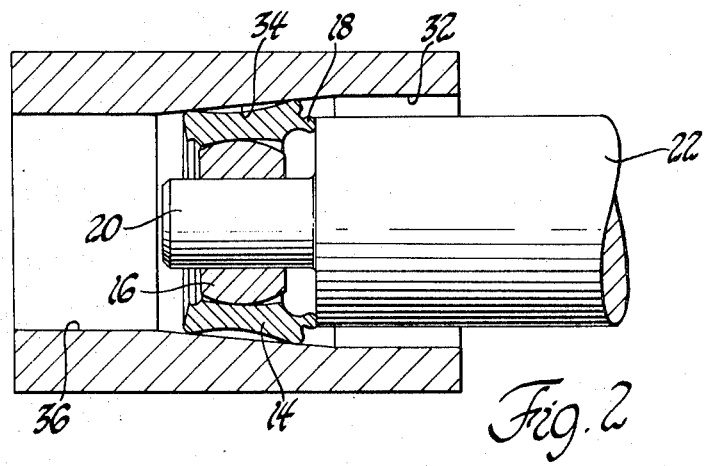
Fig. 2
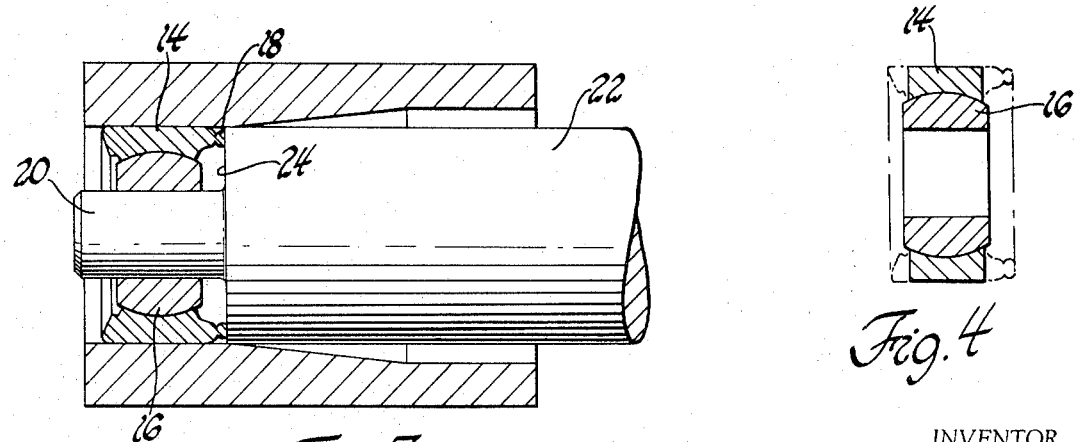
Fig. 3
Fig. 4
INVENTOR.
William A. Kuhn
BY
Barnard, McGlynn & Reising
ATTORNEYS

United States Patent Office 3,555,645
Patented Jan. 19, 1971

3,555,645
METHOD OF MAKING SPHERICAL BEARINGS
William A. Kuhn, Santa Ana, Calif., assignor to Lear Siegler, Inc., Santa Monica, Calif., a corporation of Delaware
Filed Nov. 29, 1968, Ser. No. 779,855
Int. Cl. B23p 11/00
U.S. Cl. 29—149.5      7 Claims

ABSTRACT OF THE DISCLOSURE

The invention herein described constitutes an improvement in a method of the type used for the manufacture of spherical bearings and wherein an assembly of an inner spherical ball element surrounded by a cylindrical race member is forced by a ram through the tapered bore of a swaging die to thereby swage the race member radially inwardly into conformity with the spherical surface of the inner ball member. In accordance with the invention there is positioned against the end of the ram an annulus of malleable material which serves as a spacer between the end of the ram and that portion of the race member which is swaged radially inwardly into conformity with the inner ball member. This inhibits ram wear by eliminating the galling and metal fatigue induced by contact between the ram and that portion of the race being swaged radially inwardly.

---

The subject matter of the present invention is an improved method for swaging a generally cylindrical member, and an improved structure for the work piece assembly on which the swaging operation is to be performed. The invention has particular utility for the manufacture of bearings of the type having a generally cylindrical race swaged into mated conformity with an inner ball element and, hence, will be described in detail with reference thereto.

It is already known that spherical bearings of the type having an outer race swaged into conformity with an inner ball element can be manufactured by ramming through the tapered bore of a swaging die, an assembly of the ball element surrounded by a cylindrical metal blank which, as the assembly is forced thorugh the die, is forced radially inwardly into spherical conformity with the ball element. Reference is here made to my own U.S. Pat. No. 3,377,681, assigned to the assignee of the present invention. In the method disclosed by this patent, the outer cylindrical member which is to be swaged into conformity with the ball initially has an inner surface which is cylindrical and an outer surface which has a circumferential groove of arcuate cross-section such that it is of concavo-convex compound curvature. As the assembly is forced through the die, the outer surface is caused to become cylindrical while the inner surface becomes spherical and conforms to the spherical surface of the ball element. This method has proved excellent in all respects except that particularly where the race is of a relatively hard metal, such as stainless steel, it has been found that there is considerable wear on the surface of the ram which is in contact with the race as the assembly is forced through the die. This, I have found, is due to the inherent high pressured relative movement between the surface of the race and the surface of the ram as the swaging occurs. That is, during the swaging, the axial end surface of the race inherently must move radially inwardly whereas the surface of the ram undergoes no radial movement, and the resulting relative movement between the surfaces produces galling and metal fatigue, and hence excessive wear on the ram face. Lubrication does not solve the problem because of the extremely high pressured contact of the ram surface against the surface of the race as the swaging takes place.

The present invention solves this ram wear problem. In accordance with the preferred embodiment of the invention there is placed between the ram and that portion of the cylindrical race which is to be swaged into conformity with the ball element, an annulus of malleable material which serves as a spacer between the ram and the aforesaid portion of the race member as the assembly of the race member and the ball element is forced through the die. The annulus of malleable material is free to distort or bend and shear as the swaging occurs and the surface thereof which is in contact with the ram undergoes little, if any, galling sliding movement with respect to the ram. Hence, ram life is greatly increased. In the most preferred embodiment, the annulus of malleable material is integral with and constitutes an axial extension of that portion of the race member which is to be swaged into conformity with the ball element. After the swaging operation, this axial extension can be easily machined away from the race, such machining adding substantially no cost to the manufacture of the bearing since a machining operation on the axial end surfaces of the race, after swaging, is necessary or at least desirable anyway. It is within the purview of the invention to use a spacer which is separate from the race member; however, I have found that it is generally preferable to form the spacer as an annulus integral with the race member, particularly where the race member must be pre-machined prior to the swaging operation anyway, as is generally the case. But whatever the specific embodiment used, the invention provides greatly increased ram life and commensurate savings in manufacturing costs, much in excess of the slightly added expense of providing the spacer.

The invention will now be described in detail specifically with reference to the accompanying drawings which show the preferred embodiment thereof and wherein:

FIG. 1 is an elevational view, partly in section, showing the swaging apparatus and showing the blank assembly of the subject invention mounted on the ram prior to insertion into a swaging die.

FIG. 2 is a view similar to FIG. 1 but with the blank assembly and ram shown during an early stage of the swaging operation.

FIG. 3 is a view similar to FIG. 2 but showing the assembly and ram at the conclusion of the swaging operation.

FIG. 4 is a sectional view showing the finished bearing race and inner ball element assembly.

Referring to FIG. 1, a race blank of malleable metal, generally designated by numeral 10, is mounted on a ram 12, and includes a portion 14 which is to be swaged into conformity with the inner ball element 16. The ball element 16 is truncated such that it has opposed flat sides, and has a bore extending therethrough. The axial center portion of the inner surface of race portion 14 is cylindrical and the outer surface is circumferentially grooved to concavo-convex compound curvature or, in other words, is generally toroidal. At this point it will be readily seen that when the axial ends of the outside surface of the race blank portion 14 are swaged radially inwardly to the extent that the outside surface becomes cylindrical, the inside surface of the race becomes spherical in shape and conforms to the spherical surface of the inner ball element, all as shown and described in my aforementioned U.S. Pat. No. 3,377,681.

In accordance with the present invention the race blank 10 includes a further portion 18 which constitutes an annulus extending coaxially from the race blank portion 14. This annulus 18, being integral with portion 14 and hence of the same malleable metal, is therefore itself malleable and is relatively thin walled such that it is distortible or bendable upon application of high pressure thereto by the ram 12.

Ram 12 has a stepped outer diameter including a small diametered portion 20 which fits snugly into the bore in the inner ball element 16 and a large diametered portion 22. The ram surface 24 which subtends between portions 20 and 22 bears against the end of annulus 18 and it is by way of this contact, between the ram surface 24 and annulus 18, that the race blank 10 is forced through the swaging die as hereinafter described.

Before proceeding to description of the die it bears mention that the surfaces 26 and 28 at the axial ends of the bore of race blank portion 14 are of arcuate section and extend generally radially outwardly of the cylindrical surface 14. This is to expedite final machining operations, performed after swaging, all as hereinafter described.

Swaging die 30 has a bore portion 32 essentially of the same diameter as the outermost peripheral portion of race portion 14, tapered or frusto-conical bore portion 34 which tapers inwardly from bore portion 32 and which communicates with small diametered bore portion 36. Bore portion 36 is essentially of the same diameter as that of ram portion 22 and as the axial center portion of the bearing race portion 14 prior to swaging which is, of course, the outer diameter of the race after swaging.

In operation, the ball element 16 is slid onto portion 20 of ram 12 and the race blank 10 is slipped over the ball element, the annulus 18 being brought into contact with face 24 of the ram. When annulus 18 contacts face 24 of the ram, the race blank portion 14 is centered with respect to ball element 16.

Next, ram 12, powered by any well known means, for example, mechanically or hydraulically, moves the entire assembly into and through bore 32 of swaging die and thence into the tapered bore portion 34. In accordance with the invention, the ram applies the force to the race blank 10 by way of its contact with the annulus 18, the force of the ram being transmitted to race portion 14 through the annulus 18.

As the assembly of the race blank and inner ball element move through tapered bore portion 34 of the die, the race blank portion 14 is swaged radially inwardly as shown in FIGS. 2 and 3. It will be noted that the initially circumferentially grooved exterior surface of the race portion 14 is converted into a cylindrical shape and the initially cylindrical inner surface of said race portion is converted to spherical shape in conformity to the spherical surface of the ball element 16.

During the swaging, the annulus 18 is deformed as can be seen in FIG. 3, such deformation resulting from the fact that while the race portion 14 at one end of the annulus is moving radially inwardly, the ram surface 26 which is in contact with the other end of the annulus undergoes little or no radial movement. In effect then, the deformation of the malleable annulus 18 prevents or inhibits the galling, metal fatiguing and hence ram wear inducing relative sliding movement between the ram and the race blank during swaging.

After the swaging, continued movement of the ram pushes the swaged assembly out of the die at the small diametered end thereof and the axial ends of the race, including the deformed annulus 18, are then machined away as shown in FIG. 4. During this machining operation care must be taken to prevent damage to the inner ball element that can occur if the machining tool makes contact with the ball element. To better assure against such damage the axial end portions of the race blank are recessed radially outwardly, as shown at 26 and 28 to provide some spacing between the ball element and these portions of the race to be machined away after swaging. At the conclusion of the aforesaid machining operation and after any final finishing or other operations desired (for example a finishing operation on the outer cylindrical surface of the race), manufacture of the bearing is complete.

As alluded to previously, the annulus 18 which serves as a force transmitting spacer between the ram and the race blank portion intended to be swaged can, if desired, be a separate element. However, it is generally preferable to form the annulus as an integral part of the race blank since the race blank generally must be machined or otherwise formed to size anyway prior to swaging and the extra machining necessary to form the annulus as a part of the race blank adds very little to cost.

The invention has utility other than just for the manufacture of spherical bearings of the type shown and disclosed. For example, thrust bearings wherein the inner element is generally barrel shaped, i.e., a non-spherical surface of compound curvature, can be made equally well. Also, whereas the invention has been described with reference to manufacture of a metal-to-metal spherical bearing, it has excellent utility for the manufacture of low friction lined bearings wherein the inner surface of the race is provided with a lining of resin bonded Teflon cloth or other low friction material.

Hence, it will be understood that while the invention has been described specifically without reference to a preferred embodiment thereof, various changes and modifications may be made all within the full and intended scope of the claims which follow.

The embodiments of the invention in which an exclusive property or privilege is claimed are defined as follows:

1. In a method for swaging a generally cylindrical member radially inwardly by forcing said member with a ram through a tapered bore, the improvement which comprises positioning a spacer between that portion of the cylindrical member to be swaged and the ram during said swaging to thereby inhibit ram wear inducing relative radial movement between the cylindrical member and the ram during said swaging.

2. A method as set forth in claim 1 wherein said spacer is integral with said portion of the annular member.

3. In a method for making a bearing wherein an assembly of an inner element with an outer surface of compound curvature surrounded by a generally cylindrical member is forced by a ram through a tapered bore to thereby swage the cylindrical member into mated engagement with the inner element, the improvement which comprises positioning a spacer between that portion of the cylindrical member to be swaged and the ram during said swaging to thereby inhibit ram wear inducing relative radial movement between the cylindrical member and the ram during said swaging.

4. A method as set forth in claim 3 wherein said spacer is an annulus which is integral with said portion of the cylindrical member.

5. A method as set forth in claim 3 wherein said inner element has a spherical outer surface.

6. A method as set forth in claim 4 wherein prior to swaging said generally cylindrical member has an inner cylindrical surface and an outer surface of generally toroidal shape.

7. A method as set forth in claim 3 wherein the axial end portions of said generally cylindrical member are removed after said swaging operation.

References Cited
UNITED STATES PATENTS 3,377,681  4/1968  Kuhn _____ 29—149.5
3,422,520  1/1969  Bannister _____ 29—149.5X THOMAS H. EAGER, Primary Examiner U.S. Cl. X.R.

29—441